April 5, 1966     T. DRENTH ETAL     3,244,919
ROTOR FOR SMALL ELECTRIC MOTORS
Filed March 12, 1963

INVENTORS
THIJS DRENTH
EVERHARDUS C. ETTEMA
BY
AGENT

United States Patent Office 3,244,919
Patented Apr. 5, 1966

3,244,919
ROTOR FOR SMALL ELECTRIC MOTORS
Thijs Drenth and Everhardus Catharinus Ettema, Drachten, Netherlands, assignors to North American Philips Company, Inc., New York, N.Y., a corporation of Delaware
Filed Mar. 12, 1963, Ser. No. 264,590
Claims priority, application Netherlands, Mar. 23, 1962, 276,318, 276,354
3 Claims. (Cl. 310—261)

This invention relates to a rotor for small electric motors of the type utilized in electric shavers and like devices in which a laminated body portion of the rotor is fitted on a highly polished rotor shaft. To prevent damaging the polished shaft it is known to loosely fit the laminated portion on the shaft and secure them together with a jacket of thermoplastic material such as nylon. The jacket is formed by extrusion of the plastic into a matrix or mold within which the rotor parts are held.

Plates for the laminated body portion of such rotors are punched from sheet stock and in practice it is found that large tolerances exist as regards the concentricity of the shaft bore and the outer periphery of each plate. As a result, it has been necessary to provide a large clearance in the mold or matrix to allow for variations in the radial dimensions of the laminated plates which of course requires further processing of the rotor assembly to provide true concentricity between the periphery of the rotor laminated portion and the shaft as well as to remove the resin from the rotor periphery in order that the air gap between the rotor and stator of a motor may be kept within acceptable limits.

In accordance with this invention the foregoing disadvantages are eliminated in that the matrix may be made to close tolerances so that the resin jacket does not cover the periphery of the rotor and the need for trueing operations on the rotor assembly heretofore required are likewise eliminated.

Briefly the invention consists of forming the rotor plates with greatly oversize shaft bores so that the inside surface of the lamination is spaced from the super finished surface of the shaft. The mold or matrix is provided with any suitable means for holding the shaft and the outer periphery of the set of laminations in concentric relation. Thus, when the jacket is formed by extrusion the space between the shaft and set of laminations is filled with extrudate and the parts fixed in concentric relation.

The object of this invention is therefore to provide a rotor of the type described which is more efficiently and economically manufactured than heretofore.

The foregoing object and further objects and advantages will be apparent from the following description of the invention taken with the drawing illustrating a presently preferred embodiment thereof in which.

Figure 1:
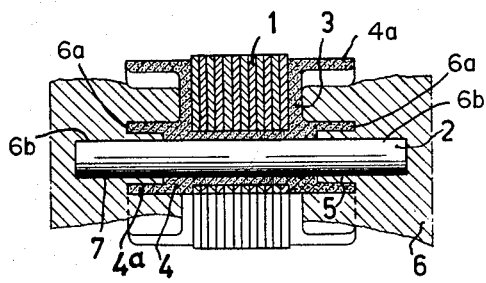
FIG. 1 is a side elevation partly in section illustrating one embodiment of the invention.
Figure 2:
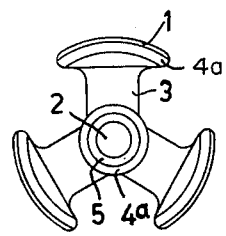
FIG. 2 is an end view of FIG. 1.

FIG. 1 shows a rotor according to the invention comprising a set of laminations or a laminated pack 1, preferably preassembled, which is loosely mounted on a polished or super-finished rotor shaft 2 in concentric relation. Thus, the axis of shaft 2 and the axis of laminated pack 1 are coincident. The set of laminations 1 and shaft 2 are fixedly united by means of a nylon jacket 3 having projections or collars 4 extending along the shaft 2 and outwardly extending flanges 4a as illustrated. As indicated in FIG. 1 the jacket is formed by concentrically mounting the shaft 2 and set of laminations 1 in a suitable mold or matrix 6 and extruding a synthetic resin into the mold. Preferably a nylon resin is used, however, any other suitable like material may be utilized.

With regard to FIG. 1 it is noted that the enlarged central bore of the set of laminations 1 fits loosely on the shaft to prevent damaging the finish. Also it is noted that flanges 4a are provided to prevent extrudate from passing onto the periphery of the laminations 1 or along the shaft bearings 7. Plastic which reaches these surface areas must be removed which is costly and time consuming. Additionally, removing the jacket material or plastic, from the bearing surfaces 7 adjacent the ends of the shaft 2 is practically impossible to accomplish without damaging the shaft and greatly increasing rejects. As a result the inner flange 4a on each side of the jacket adjacent the shaft 2 is formed slightly spaced from the shaft. As seen in FIG. 1 this is readily accomplished by providing an annular recess 6a in the matrix 6 surrounding the aperture receiving the shaft. This recess relieves the pressure of extrudate at the interface 6b between the shaft 2 and matrix 6 thereby avoiding penetration of extrudate at this interface. When the assembly is removed from the mold a recess is formed between the shaft and the innermost flange of the jacket. Reference numeral 5 indicates this recess.

Figure 3:
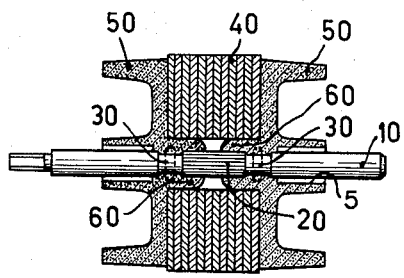
FIG. 3 is a sectional view of another embodiment of the invention.

As seen in the modification of FIG. 3 the shaft 10 is provided with a centrally located knurled or milled section 20 to prevent relative rotation between the shaft and rotor body. Provided intermediate each end of the milled section and the superfinished bearing surface of the shaft are a pair of undercuts or recess 30 of reduced diameter. Alternatively, rings (shown in phantom) may be used instead of an undercut to prevent relative axial movement between the shaft 10 and body 40. The set of laminations 40 surrounding the shaft 10 are fixed in the concentric position illustrated in the drawing by the jacket 50 of nylon or the like. The central bore of the laminations 40 is much larger than the diameter of the shaft 10 whereby collars 60 substantially fill the space therebetween during formation by extrusion of the jacket.

Rotors of the type described above are manufactured by placing the set of rotor laminations in a suitable cavity of a matrix closed by pieces which centrally locate the rotor shaft in the cavity and concentric with the laminations. The outer periphery of the set of laminations can therefore be optimally centered relative to the shaft. The mold or matrix spaces are then filled preferably with a measured quantity of molten nylon extruded under pressure which penetrates the space between the shaft and the laminations. After cooling of the nylon a rigid assembly is produced without axial or radial displacement of the assembled rotor pieces and negligible penetration of resin between the plates of the lamination. Also, in view of the large space between the rotor parts and the provision of flanges integral with the jacket, the extrudate does not coat the outer peripheral surface of the laminated portion of the rotor nor the bearing portion of the shaft held loosely in the matrix piece to prevent damaging the polished bearing surface.

It will be evident from the foregoing that a rigid rotor assembly consisting of laminated rotor body portion, a true concentric shaft and resin jacket is provided which is economically manufactured.

The foregoing is given by way of example of presently preferred embodiments of this invention and it is intended that variations and equivalent arrangements are encompassed within the scope of the subjoined claims.

What is claimed is:

1. A rotor assembly comprising a set of laminations concentrically surrounding a shaft in spaced relation therewith and intermediate the ends thereof, a jacket of synthetic resin material formed in situ for securing said laminations and the adjacent shaft surface in concentric relation and leaving the end portion of said shaft exposed, said jacket having collars integral therewith extending inwardly along said shaft between said shaft and the adjacent surface of said set of laminations, said jacket having an annular outwardly projecting flange at each end in spaced substantially parallel relation adjacent to the exposed portions of said shaft and another annular outwardly projecting flange at each end substantially parallel with said first mentioned flange adjacent the periphery of said laminations.

2. A rotor assembly according to claim 1 wherein said shaft has a central milled portion, bearing portions adjacent the ends thereof and means for securing said assembly against relative axial movement intermediate said milled portion and said bearing portions.

3. A rotor assembly comprising a set of laminations concentrically surrounding a shaft in spaced relation therewith and intermediate the ends thereof, a jacket of synthetic resin material formed in situ for securing said laminations and the adjacent shaft surface in concentric relation and leaving the end portion of said shaft exposed, said jacket having collars integral therewith extending inwardly along said shaft between said shaft and the adjacent surface of said set of laminations and said jacket having an annular outwardly projecting flange at each end in spaced substantially parallel relation adjacent to the exposed portions of said shaft.

References Cited by the Examiner

UNITED STATES PATENTS

| | | | |
|---|---|---|---|
| 1,190,054 | 7/1916 | Wiard | 310—211.0 |
| 1,803,493 | 5/1931 | Volet | 310—270 X |
| 1,554,702 | 9/1925 | Bergman | 310—211.0 |
| 2,447,657 | 8/1948 | Ludwig et al. | 310—211.0 |
| 2,488,729 | 11/1949 | Kooyman. | |
| 2,688,103 | 8/1954 | Sheldon. | |
| 2,753,473 | 7/1956 | Hamm | 310—211 X |
| 3,045,132 | 7/1962 | Yeoman | 310—43 |
| 3,058,156 | 10/1962 | O'Connorr | 310—43 |

FOREIGN PATENTS

| | | |
|---|---|---|
| 16,811 | 7/1909 | Great Britain. |
| 91,227 | 12/1920 | Switzerland. |

MILTON O. HIRSHFIELD, *Primary Examiner.*

ORIS L. RADER, *Examiner.*

J. J. SWARTZ, *Assistant Examiner.*